(12) United States Patent
Shim et al.

(10) Patent No.: US 8,482,842 B2
(45) Date of Patent: Jul. 9, 2013

(54) METHOD OF MANUFACTURING SMART PANEL AND SMART PANEL

(75) Inventors: Myun-Gi Shim, Yongin-si (KR); Soo-Ho Park, Yongin-si (KR); Dong-Gun Moon, Yongin-si (KR); Mi-Hyun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 29 days.

(21) Appl. No.: 12/914,880

(22) Filed: Oct. 28, 2010

(65) Prior Publication Data

US 2011/0134503 A1  Jun. 9, 2011

(30) Foreign Application Priority Data

Dec. 3, 2009 (KR) ......... 10-2009-0119098

(51) Int. Cl.
*G02F 1/01* (2006.01)
(52) U.S. Cl.
USPC ......... 359/288
(58) Field of Classification Search
USPC ......... 359/288
See application file for complete search history.

(56) References Cited

U.S. PATENT DOCUMENTS

| | | | |
|---|---|---|---|
| 3,834,793 A * | 9/1974 | McConnell et al. ......... 359/289 |
| 4,900,634 A | 2/1990 | Terneu et al. | |
| 6,463,760 B1 | 10/2002 | Fink-Straube et al. | |
| 6,872,452 B2 | 3/2005 | Taninaka et al. | |
| 2003/0054177 A1 | 3/2003 | Jin | |
| 2009/0323157 A1 | 12/2009 | Valentin et al. | |
| 2010/0183854 A1 | 7/2010 | Masuda et al. | |
| 2012/0040192 A1 * | 2/2012 | Lipson et al. ......... 428/432 |

FOREIGN PATENT DOCUMENTS

| | | |
|---|---|---|
| JP | 07-331430 | 12/1995 |
| JP | 2001-48587 | 2/2001 |
| JP | 2004-346261 | 12/2004 |
| KR | 2001-0079743 A | 8/2001 |
| KR | 10-2002-0076784 | 10/2002 |
| KR | 10-2006-0088152 | 8/2006 |
| WO | WO 2008/087077 A1 | 7/2008 |

OTHER PUBLICATIONS

Bradley, et al., "Alkoxides of Vanadium (IV)", Can. J. Chem., vol. 40, 1962 (pp. 1183-1188).
KIPO Office Action issued on Jul. 6, 2011 for KR Application No. 10-2009-0119098 (3 pages).
KIPO Notice of Allowance dated Mar. 5, 2012, for Korean priority Patent application 10-2009-0119098, (5 pages).
European Search Report dated Jan. 7, 2013, for corresponding European Patent application 10252047.5, (5 pages).

* cited by examiner

*Primary Examiner* — James Jones
(74) *Attorney, Agent, or Firm* — Christie, Parker & Hale, LLP

(57) ABSTRACT

A method of manufacturing a smart panel and a smart panel. A method of manufacturing a smart panel includes spraying a coating solution including a thermochromic material and a silicon oxide on a surface of a transparent substrate, and drying the coating solution to form a coating film on the surface of the substrate. A smart panel is manufactured in accordance with the above-described method.

20 Claims, 2 Drawing Sheets

METHOD OF MANUFACTURING SMART PANEL AND SMART PANEL

CROSS-REFERENCE TO RELATED APPLICATION

This application claims the benefit of Korean Patent Application No. 10-2009-0119098, filed on Dec. 3, 2009 in the Korean Intellectual Property Office, the disclosure of which is incorporated herein in its entirety by reference.

BACKGROUND

1. Field

Aspects of one or more embodiments of the present invention relate to a method of manufacturing a smart panel, and a smart panel manufactured using the method.

2. Description of the Related Art

A smart panel, or smart glass, refers to a panel (e.g., a glass panel) of which light transmittance changes according to its external environment. Examples of smart glass may include electrochromic glass, thermochromic glass, and thermotropic glass. An electrochromic glass refers to glass of which light transmittance changes according to applied electricity. A thermochromic glass refers to glass of which light transmittance of an infrared wavelength region changes according to its temperature or heat. A thermotropic glass refers to glass of which light transmittance of a visible wavelength region changes according to its temperature or heat.

SUMMARY

According to aspects of embodiments of the present invention, a method of manufacturing a smart panel (e.g., a glass panel) includes using a wet process, and a smart panel (e.g., a glass panel) is manufactured using the method.

Additional aspects of embodiments of the present invention will be set forth, in part, in the description of some exemplary embodiments which follows and, in part, will be apparent from the description, or may be learned by practice of the presented embodiments.

According to an embodiment of the present invention, a method of manufacturing a smart panel includes spraying a coating solution including a thermochromic material and a silicon oxide on a surface of a transparent substrate; and drying the coating solution to form a coating film on the surface of the substrate.

The coating film may include a multi-layered structure. The coating film may include the multi-layered structure by distributing compounds of the coating solution according to their specific gravities when the coating film is dried.

The thermochromic material may include vanadium dioxide ($VO_2$), and the silicon oxide may include silicon dioxide ($SiO_2$). A molar ratio of the vanadium dioxide with respect to the silicon dioxide in the coating film may be 5:5 or greater. In one embodiment, a method further includes forming a silicon oxide layer on the coating film.

A thickness of the coating film may be 500 μm or less. The transparent substrate may be a glass substrate.

A smart panel may be manufactured in accordance with a method according to embodiments described above.

According to another embodiment of the present invention, a smart panel includes a transparent substrate; and a light transmittance adjusting layer formed by wet-coating a coating solution including a vanadium oxide and a silicon oxide on the substrate, and a molar ratio of the vanadium oxide with respect to the silicon oxide in the light transmittance adjusting layer is 5:5 or greater.

The smart panel may further include a silicon oxide layer on the light transmittance adjusting layer.

A thickness of the light transmittance adjusting layer may be 500 μm or less.

The light transmittance adjusting layer may include a multi-layered structure.

The transparent substrate may be a glass substrate.

BRIEF DESCRIPTION OF THE DRAWINGS

The above and/or other features and aspects of embodiments of the present invention will become more apparent to and readily appreciated by those skilled in the art from the following description of some exemplary embodiments of the present invention, taken in conjunction with the accompanying drawings of which.

DETAILED DESCRIPTION

Figure 1:
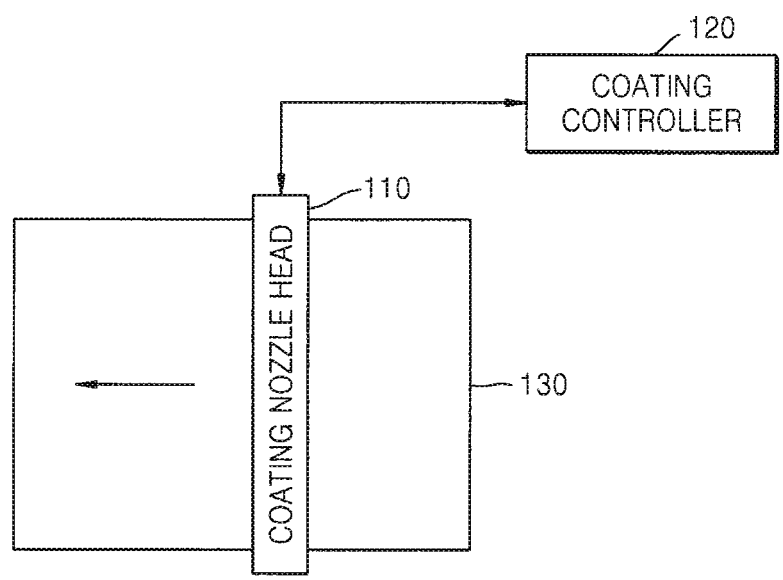
FIGS. 1 and 2 are schematic diagrams illustrating an operation of coating a thermochromic material on a substrate, according to an embodiment of the present invention.

Some exemplary embodiments will now be described more fully hereinafter with reference to the accompanying drawings, wherein like reference numerals refer to the like elements throughout. Embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art.

Figure 2:
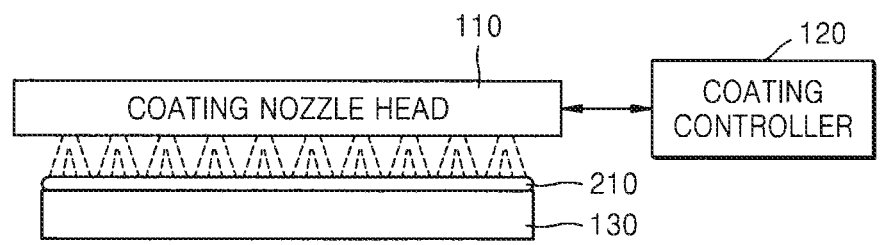

FIGS. 1 and 2 are schematic diagrams for explaining an operation of coating a thermochromic material on a substrate 130, according to an embodiment of the present invention.

According to one embodiment, a thermochromic material is coated on the substrate 130 by spraying a liquid coating solution on the substrate 130 and subsequently drying the sprayed coating solution. In one embodiment, as illustrated in FIG. 1, the coating solution is sprayed on a surface of the substrate 130 as a coating nozzle head 110 moves over the substrate 130. In one embodiment, a coating controller 120 controls the movement of the coating nozzle head 110 and the supply of the coating solution to the coating nozzle head 110. However, in other embodiments, the coating solution may be sprayed on the substrate 130 by using any of various suitable methods, and, thus, embodiments of the present invention are not limited to the above-described method shown in FIG. 1.

FIG. 2 is a schematic diagram of an operation of spraying the coating solution, viewed from a side. Referring to FIG. 2, when the coating solution is sprayed on the substrate 130, a coating solution film 210 is formed on the substrate 130.

The substrate 130, in one embodiment, is a glass substrate, such as plate glass usable as a window. The substrate 130, in other embodiments, may be any other suitable substrate that is transparent and substantially smooth, and of any suitable material, thickness, dimensions, and shape selected according to purpose or desired characteristics. In one embodiment, for example, the substrate 130 is a flat substrate that is usable as a window pane, and may be formed of any glass or any other suitable flat transparent substrate. In other embodiments, for example, the substrate 130 may include an indium tin oxide (ITO) substrate, an ITO substrate on which a coloring material (e.g., NiO, $Cr_2O_3$, CoO, etc.) is deposited, a polymer film, such as polyester, polysulfone, polycarbonate, polyamide, polystyrene, polymethylpentane, polyethyleneterephthalate, or polyvinylchloride, or a substrate including a polymer film on which a coloring material is deposited. Further, in one embodiment, the substrate 130 may be surface-treated in order to easily coat a thermochromic layer thereon.

The coating solution, in one embodiment, includes a thermochromic material and a silicon oxide. According to an embodiment of the present invention, a coating film may have a multi-layered structure by using a coating solution including a thermochromic material and a silicon oxide. Since a thermochromic material and a silicon oxide have different specific gravities, the coating film may have the multi-layered structure by distributing the thermochromic material and the silicon oxide according to their specific gravities when the thermochromic material and the silicon oxide are dried.

In the thermochromic material, metal insulator transition (MIT) occurs at a predetermined temperature (i.e. a phase transition temperature). That is, when an ambient temperature is higher than a phase transition temperature of the thermochromic material, the thermochromic material blocks or reflects infrared rays. When an ambient temperature is lower than a phase transition temperature of the thermochromic material, the thermochromic material transmits infrared rays.

The thermochromic material, in one embodiment, is a vanadium oxide ($V_xO_y$). For example, the thermochromic material may be vanadium dioxide $V_xO_y$ where x:y=1:2, vanadium oxide ($VO_x$) where x<2, or vanadium oxide $V_xO_y$ where x:y=2:5. Vanadium oxide (VO) where x<2 may be used as the thermochromic material since a relatively small amount of vanadium oxide ($V_xO_y$) is oxidized. Also, a vanadium oxide ($V_xO_y$) exists as vanadium dioxide $V_xO_y$ where x:y=1:2 in a uniform structure, and vanadium atoms may exist in a metallic state, depending on the case. In particular, it is known that vanadium dioxide ($VO_2$) has a phase transition temperature of about 68° C. That is, $VO_2$ exists in a metallic state at a temperature higher than 68° C., and blocks or reflects infrared rays. In addition, $VO_2$ exists in a semiconductor state at a temperature lower than 68° C., and transmits infrared rays. However, the thermochromic material of embodiments of the present invention is not limited to a vanadium oxide, and in other embodiments, any other thermochromic material may be used in which infrared transmittance changes significantly at or approximately at a transition temperature.

The silicon oxide may be silicon dioxide ($SiO_2$). Since the silicon oxide has a high affinity with the substrate 130 (e.g., a glass substrate), the coating solution includes the silicon oxide, thereby increasing cohesion between the coating solution and the substrate 130.

Figure 3:
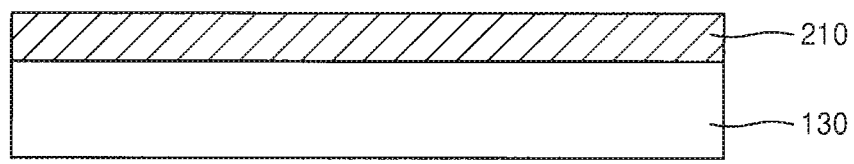
FIG. 3 is a cross-sectional view of a smart panel having a coating solution sprayed on a substrate, according to an embodiment of the present invention.

FIG. 3 is a cross-sectional view of a smart panel having a coating solution sprayed on a substrate, according to an embodiment of the present invention.

Referring to FIG. 3, when the coating solution is sprayed on the substrate 130, the coating solution film 210 in a liquid state exists on the substrate 130. In one embodiment, a solvent included in the coating solution evaporates to dry the coating solution film 210, thereby forming the coating solution film 210 in a solid state. While the coating solution film 210 is being dried, a solvent may evaporate and a film formed of thermochromic material may be formed.

A $VO_2$ film having thermochromic properties may be formed, in one embodiment, using a sol-gel method as follows.

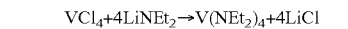

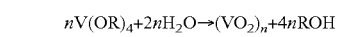

(Reference: Can. J. Chem. 1962. Vol 40. pp 1183)

In order to adjust the optical properties of the $VO_2$ film, a refractive index of the $VO_2$ film may be adjusted. The refractive index of $VO_2$ is 2.8, and thus $VO_2$ is an optical material having a relatively high refractive index. Thus, in order to adjust the optical properties of the $VO_2$ film, an element for adjusting a refractive index may be used. To achieve this, in one embodiment, $SiO_2$ having a low refractive index of about 1.5 is substituted for some compounds of the $VO_2$ film to form a combined film having a low refractive index.

The following reaction scheme shows $SiO_2$ substituted for some ingredients of $VO_2$.

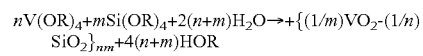

By the above reaction, a proportion of the substituted $SiO_2$ in the $VO_2$ film may be adjusted, and the refractive index of the $VO_2$ film may be adjusted to be about 1.5 to about 2.8, according to an amount of silicon alkoxide added to vanadium alkoxide.

The following reaction scheme shows an example where vanadium tetraisopropoxide is used.

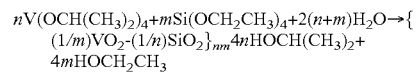

Data of Properties

EXAMPLE 1

Refractive index=1.45 where n=0 and m=1

EXAMPLE 2

Refractive index=2.82 where n=1 and m=0

EXAMPLE 3

Refractive index=1.95 where n=0.7 and m=0.3

EXPERIMENTAL EXAMPLE

Experimental Example 1

About 10% $SiO_2$ sol solution was prepared by diluting 173 g of tetraethoxysilane and 30 g of water with an ethanol solution to produce 500 ml of a solution, adjusting the PH of the produced solution to be 2 and then stirring the produced solution at a temperature of 60° C. for one hour. The temperature was lowered to room temperature, 10 g of the about 10% $SiO_2$ sol solution was diluted with 20 ml of methanol, 40 m of ethanol, and 30 ml of isopropyl alcohol, and then the resulting solution was coated. A coating film was sintered at a temperature of 300° C. for one hour, and a refractive index of the coating film was measured.

Experimental Example 2

A film having a refractive index of 2.82 was prepared by synthesizing $V(OR)_4$ according to Can. J. Chem. 1962. Vol 40, pp 1183, diluting 5 g of V(OR)$_4$ with 200 ml of ethanol, 200 ml of isopropyl alcohol, and 100 ml of butanol, and then coating and sintering the resulting solution.

Experimental Example 3

A film having a refractive index of 1.95 was prepared by diluting 15 g of the about 10% SiO$_2$ sol solution synthesized in Example 1 and 5 g of V(OR)$_4$ prepared using the same method as in Example 2 with 200 ml of ethanol, 200 ml of isopropyl alcohol, and 100 ml of butanol, and then coating and sintering the resulting solution.

In addition, in embodiments of the present invention, the amount and chemical composition of the coating solution may be adjusted so as to adjust a thickness of the coating solution film 210 to be 500 μm or less. In order to adjust the thickness of the coating solution film 210, the chemical composition or coating speed of the coating solution may be adjusted. When general dip-coating is used, a thickness of a coating film formed in a first coating operation may be about 50 nm to about 200 nm, and a thickness of the coating film formed in a second or third coating operation may be greater than in the first coating operation. However, as the coating film is formed thicker, light transmittance of the coating film is further reduced, or it is more difficult to uniformly adjust a thickness of the coating film. A general optical film may have optical properties by using a single coating operation. In addition, in one embodiment, a second film formed of SiO$_2$ may be formed on the coating solution film 210, or combined film, formed of VO$_2$ and SiO$_2$ in order to prevent light from being reflected on the coating solution film 210 and to protect the coating solution film 210. The second film, in one embodiment, may be formed of at least one selected from the group consisting of SiO$_2$, titanium dioxide (TiO$_2$), indium tin oxide (ITO), antimony tin oxide (ATO) and zinc oxide (ZnO). These materials are transparent, and it is easy to form an optical film with these materials.

In the coating solution, as a proportion of SiO$_2$ is increased, a proportion of VO$_2$ having thermochromic properties is reduced. Thus, in one embodiment, the chemical composition of the coating solution may be selected such that a molar ratio of vanadium oxide with respect to silicon oxide is at least 50%. Moreover, in order to adjust a refractive index of the coating film, chemical ratios of vanadium oxide and silicon oxide in the coating solution may be adjusted so as to obtain a desired molar ratio of the vanadium oxide with respect to the silicon oxide.

Figure 4:
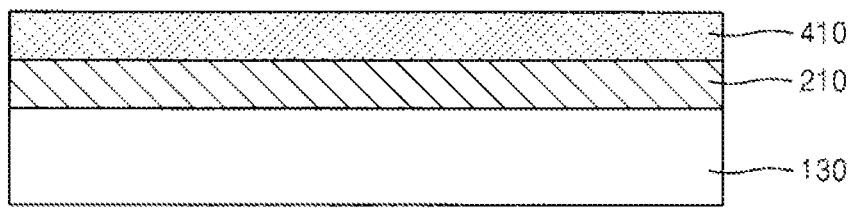
FIG. 4 is a cross-sectional view of a smart panel according to another embodiment of the present invention.

Generally, since a thermochromic layer is stacked on a substrate (e.g., a glass substrate), a reflectivity of a manufactured smart glass is increased due to a refractive index difference between the thermochromic layer and the glass substrate that is mainly formed of SiO$_2$. However, according to another embodiment of the present invention, as illustrated in FIG. 4, a silicon oxide layer 410, such as a SiO$_2$ layer, is formed on the coating solution film (that is, a thermochromic layer) 210 in order to protect the thermochromic layer. As shown in Examples 1 and 2, a refractive index difference between a SiO$_2$ layer and a VO$_2$ layer is about 1.4. Due to the refractive index difference, the reflectivity of a smart glass manufactured by only stacking the SiO$_2$ layer on a thermochromic layer formed of VO$_2$ is increased. However, according to the above embodiments of the present invention, in order to prevent or reduce an increase in reflectivity due to a refractive index difference between layers included in the smart glass, the refractive index difference may be reduced by increasing a proportion of SiO$_2$ in the thermochromic layer. In one embodiment, in order for the thermochromic layer to maintain its thermochromic properties, a molar ratio of VO$_2$ with respect to SiO$_2$ may be maintained to be 5:5 or greater in the thermochromic layer.

As described above, according to one or more embodiments of the present invention, a coating film of a smart panel (e.g., a smart glass) may have a multi-layered structure by manufacturing the smart glass by using a wet process. In addition, the reinforcement of the smart glass may not be released, or the structure of the smart glass may not be changed, by heat during a coating operation by manufacturing the smart glass at a low temperature or room temperature.

Some exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of manufacturing a smart panel, the method comprising:
spraying a coating solution comprising a themochromic material and a silicon oxide on a surface of a transparent substrate; and
drying the coating solution to form a coating film on the surface of the substrate.

2. A smart panel manufactured in accordance with the method of claim 1.

3. The method of claim 1, wherein the coating film comprises a multilayered structure.

4. The method of claim 3, wherein compounds of the coating solution are distributed according to their specific gravities when the coating film is dried to form the multi-layered structure.

5. A smart panel manufactured in accordance with the method of claim 3.

6. The method of claim 1, wherein the thermochromic material comprises vanadium dioxide (VO$_2$), and the silicon oxide comprises silicon dioxide (SiO$_2$).

7. A smart panel manufactured in accordance with the method of claim 6.

8. The method of claim 6, wherein a molar ratio of the vanadium dioxide with respect to the silicon dioxide in the coating film is 5:5 or greater.

9. A smart panel manufactured in accordance with the method of claim 8.

10. The method of claim 8, further comprising forming a silicon oxide layer on the coating film.

11. A smart panel manufactured in accordance with the method of claim 10.

12. The method of claim 1, wherein a thickness of the coating film is 500 μm or less.

13. A smart panel manufactured in accordance with the method of claim 12.

14. The method of claim 1, wherein the substrate is a glass substrate.

15. A smart panel manufactured in accordance with the method of claim 14.

16. A smart panel comprising:
a transparent substrate; and
a light transmittance adjusting layer formed by wet-coating a coating solution comprising a vanadium oxide and a silicon oxide on the substrate,
wherein a molar ratio of the vanadium oxide with respect to the silicon oxide in the light transmittance adjusting layer is 5:5 or greater.

17. The smart panel of claim 16, further comprising a silicon oxide layer on the light transmittance adjusting layer.

18. The smart panel of claim 16, wherein a thickness of the light transmittance adjusting layer is 500 μm or less.

19. The smart panel of claim 16, wherein the light transmittance adjusting layer comprises a multi-layered structure.

20. The smart panel of claim 16, wherein the substrate is a glass substrate.

* * * * *

UNITED STATES PATENT AND TRADEMARK OFFICE
CERTIFICATE OF CORRECTION

| | | |
|---|---|---|
| PATENT NO. | : 8,482,842 B2 | Page 1 of 1 |
| APPLICATION NO. | : 12/914880 | |
| DATED | : July 9, 2013 | |
| INVENTOR(S) | : Myun-Gi Shim et al. | |

It is certified that error appears in the above-identified patent and that said Letters Patent is hereby corrected as shown below:

In the Claims

Column 6, Claim 1, line 23          Delete "themochromic"
                                    Insert -- thermochromic --

Column 6, Claim 3, line 31          Delete "multilayered"
                                    Insert -- multi-layered --

Signed and Sealed this
Second Day of December, 2014

Michelle K. Lee
*Deputy Director of the United States Patent and Trademark Office*